(12) United States Patent
Tsirkin et al.

(10) Patent No.: US 11,074,094 B2
(45) Date of Patent: Jul. 27, 2021

(54) SECURING HYPERCALL SUPPORT FOR USER SPACE PROCESSES IN VIRTUAL MACHINES

(71) Applicant: Red Hat, Inc., Raleigh, NC (US)

(72) Inventors: Michael Tsirkin, Lexington, MA (US); Paolo Bonzini, Turate (IT)

(73) Assignee: Red Hat, Inc., Raleigh, NC (US)

( * ) Notice: Subject to any disclaimer, the term of this patent is extended or adjusted under 35 U.S.C. 154(b) by 99 days.

(21) Appl. No.: 16/116,729

(22) Filed: Aug. 29, 2018

(65) Prior Publication Data

US 2020/0073689 A1 Mar. 5, 2020

(51) Int. Cl.
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/0665* (2013.01); *G06F 3/0673* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 9,536,088 B1 | 1/2017 | Igotti et al. | |
| 9,697,027 B1 | 7/2017 | Hazra et al. | |
| 2013/0086299 A1 | 4/2013 | Epstein | |
| 2015/0007170 A1* | 1/2015 | Tsirkin | G06F 9/45533 718/1 |
| 2016/0188360 A1* | 6/2016 | Allen | G06F 9/5027 718/1 |
| 2016/0224383 A1* | 8/2016 | Bonzini | G06F 9/5016 |
| 2016/0306966 A1* | 10/2016 | Srivastava | H04L 63/08 |
| 2017/0161865 A1* | 6/2017 | Baudouin | G06F 9/45508 |
| 2017/0371733 A1* | 12/2017 | Rugina | G06F 3/0659 |
| 2019/0065226 A1* | 2/2019 | Neiger | G06F 9/45558 |

FOREIGN PATENT DOCUMENTS

WO 2015023607 A1 2/2015

OTHER PUBLICATIONS

Philip Reames et al. (Jan. 2007). A Hypervisor for Embedded Computing. Retrieved from https://www.reasearchgate.net/publication/250165248 on May 5, 2018. 8 pages.

* cited by examiner

*Primary Examiner* — Charles E Anya
(74) *Attorney, Agent, or Firm* — Lowenstein Sandler LLP

(57) ABSTRACT

In one embodiment, a hypervisor may identify a memory location associated with a user space process operating on a virtual machine and a type of a request to be stored at the memory location by the user space process when the user space process invokes the hypercall. The hypervisor may associate a hypercall parameter with the memory location and the type of the request, the hypercall parameter to be used to determine whether the type of the request associated with the hypercall invoked by the user space process is permitted to be executed. The hypervisor may transmit a notification comprising the hypercall parameter to the user space process to cause the user space process to use the hypercall parameter when invoking the hypercall to indicate to the hypervisor the memory location and type of the request is stored at the memory location.

20 Claims, 9 Drawing Sheets

SECURING HYPERCALL SUPPORT FOR USER SPACE PROCESSES IN VIRTUAL MACHINES

TECHNICAL FIELD

The present disclosure is generally related to virtualization in a computing environment, and more particularly, to securing hypercall support for user space processes in virtual machines.

BACKGROUND

Virtualization allows multiplexing of an underlying host machine between different virtual machines. The host machine allocates a certain amount of its storage resources to each of the virtual machines. Each virtual machine is then able to use the allocated storage resources to execute applications, including operating systems (referred to as guest operating systems). Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
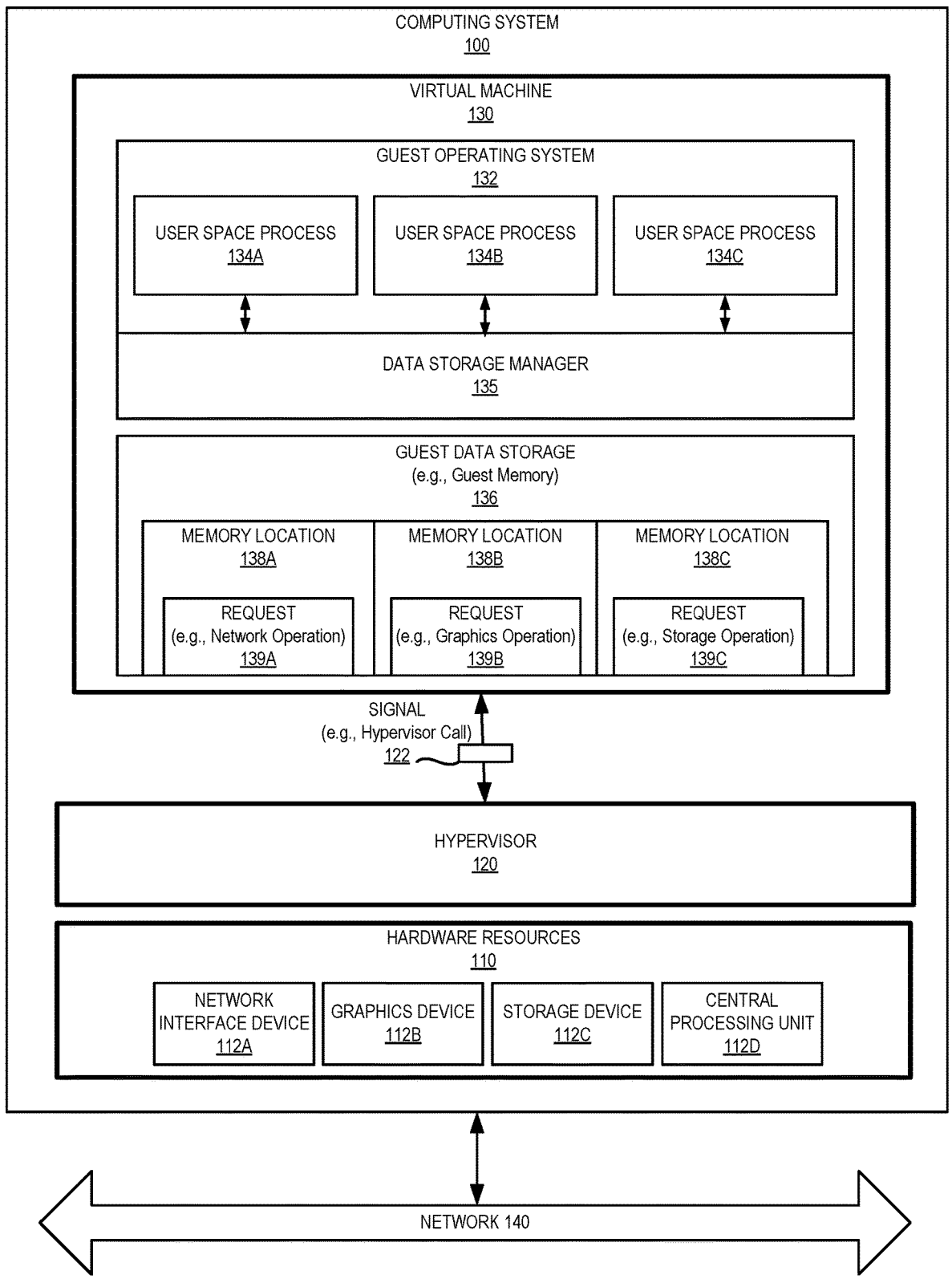
FIG. 1 depicts a high-level block diagram of an example computing system that enables a hypervisor to execute requests for a guest user space process in a security enhanced manner when the guest user space process invokes a hypercall associated with the request, in accordance with one or more aspects of the present disclosure.

Modern computer systems often include virtualization technology that supports paravirtualization to further optimize the use of underlying hardware resources. Paravirtualization may be a virtualization technique that enables a guest operating system to be aware of the underlying virtualization technology and to communicate with the underlying virtualization technology (e.g., hypervisor). Paravirtualization may provide a communication interface to a guest operating system that enables the guest operating system to communicate with a hypervisor using hypercalls (e.g., hypervisor calls). The hypercalls may enable guest code executed by the virtual machine to initiate communication with the hypervisor. The guest code may include one or more guest operating systems, applications, drivers, other executable code, or a combination thereof. The hypercalls may provide an efficient communication channel with the hypervisor but may not provide the level of security preferred by some computing environments. As a result, computing environments may be encouraged to restrict the use of hypercalls by user space processes, which may reduce the ability of the user space processes to benefit from the more efficient communication channel provided by hypercalls.

Aspects of the present disclosure address the above and other deficiencies by providing technology that enables a hypervisor to securely execute a request associated with a hypercall invoked by a user space process operating on a virtual machine. In some embodiments, the user space process may be a non-privileged process on the virtual machine and a guest operating system of the virtual machine may not be executing in a supervisory mode when the user space process invokes the hypercall. The technology may supplement hypercalls with native data storage security mechanisms, such as page tables. For example, a hypervisor or a guest operating system may configure a memory location (e.g., storage unit) to be accessible by a particular user space process managed by the guest operating system. The memory location may be used by the user space process to store one or more requests. The requests may include one or more hardware operations and may be interpreted by a hypervisor. In one example, a kernel of the guest operating system or the hypervisor may configure multiple memory locations and each memory location may correspond to a particular type of hardware resource of a set of hardware resources (e.g., network controller, graphics controller, storage device controller). The kernel may provide one or more user space processes with access to the one or more memory locations to provide the user space processes with access to the respective hardware resources.

In some embodiments, the address of the memory location and a type of request that the user space process is to store in the memory location may be provided by the user space process and/or the guest operating system to the hypervisor. The hypervisor may create an association between a hypercall parameter (e.g., an identifier, a table index value, etc.) and the address of the memory location and/or the type of the request to be stored in the memory location. The association may be created for example as a mapping in a table stored in memory. The hypervisor may maintain the association and may create and maintain additional associations as desired by the user space process and/or the guest operating system.

Upon creating the association, in some embodiments, the hypervisor may transmit a notification including the hypercall parameter to the user space process to cause the user space process to use the hypercall parameter when invoking the hypercall to indicate to the hypervisor that the request is stored at the memory location and to indicate the type of the request that is stored at the memory location. The user space process may begin invoking hypercalls when the secure environment is prepared and the user space process receives the hypercall parameter. For example, the user space process may store a request at the memory location, and the hypervisor or the underlying processing device may perform a security check to ensure the user space process is authorized to store data at the memory location. The user space process may also store the hypercall parameter associated with the memory location in a storage field (e.g., general purpose register of the underlying processing device) accessible to the hypervisor and the user space process.

The user space process may then transmit, to the hypervisor, a signal (e.g., by executing a hypercall) that is associated with the memory location and the request. The hypervisor may obtain the hypercall parameter from the storage field and obtain the request and the memory location in view of the association between the hypercall parameter and the request and the memory location, which may be stored in a mapping table. The hypervisor may obtain the request from the memory location. Additionally, the hypervisor may determine whether the type of the request associated with the hypercall invoked by the user space process and stored in the mapping table is permitted to be executed in view of the native data storage security mechanisms of the processing device. The hypervisor may also determine whether the user space process is authorized to perform the request stored at the memory location.

If the type of the request obtained using the hypercall parameter is not the type to be expected in view of the association between the hypercall parameter and the type of the request, the hypervisor may not execute the request and/or notify the user space process and/or the guest operating system. If the type of the request obtained using the hypercall parameter is the type to be expected in view of the association between the hypercall parameter and the type of the request, the hypervisor may execute the request. In one embodiment, the associations in the mapping table may include a valid bit that may be set by the guest operating system when storing a new association.

Further, if the hypervisor determines that the user space process is authorized to perform the request stored at the memory location, the hypervisor may execute the request on behalf of the user space process. If the hypervisor determines that the user space process is not authorized to perform the request stored at the memory location, the hypervisor may not execute the request on behalf of the user space process.

The hypervisor may check the valid bit to ensure the association is valid prior to executing the request. If the valid bit is not set to a value indicating that the request is valid, the hypervisor may not execute the request and/or may notify the user space process and/or the guest operating system. If the valid bit is set to a value indicating that the request is valid, the hypervisor may execute the request and set the valid bit to a value indicating that the request is executed and/or no longer valid.

In some embodiments, the hypervisor may transmit a notification to the user space process that indicates that the request was or was not executed. For example, the hypervisor may store a notification in a storage field (e.g., general purpose register of the underlying processing device) accessible to the hypervisor and the user space process The systems and methods described herein include technical improvements to virtualization technology. In particular, aspects of the present disclosure may enhance the security of communications between a guest user space process and the hypervisor by incorporating data storage security checks with user space process signals (e.g., via hypercalls). For example, the user space process may provide, via a memory location, a request for a hardware operation to the hypervisor. The user space process may undergo a security check when invoking the hypercall and the hypervisor may execute the request after the security check has been performed. Further, the hypervisor maintains associations of hypercall parameters to the memory locations and the types of the requests to be stored in the memory locations by the user space processes. Thus, in some embodiments, the hypervisor may be enabled to securely execute a request associated with a hypercall invoked by a user space process operating on a virtual machine when the request is of a permitted type for the particular memory location identified via the hypercall parameter. In addition, aspects of the present disclosure may enable controlling which guest user space processes have access to which hardware resources by controlling which memory locations are accessible by the user space processes. The use of the memory locations to broker requests enables a hypervisor to control a user space process's access to hardware resources without the overhead of brokering each individual request communicated between the user space process and the hypervisor.

Various aspects of the above referenced methods and systems are described in details herein below by way of examples, rather than by way of limitation. The examples provided below discuss a virtualized computer system where the user space processes are managed by aspects of a virtual machine, a hypervisor, a host operating system, or a combination thereof. In other examples, the user space processes are managed by a computing system that uses other forms of virtualization (e.g., operating-system-level virtualization) and may be absent the hypervisor discussed below.

FIG. 1 depicts an illustrative architecture of elements of a computing system 100, in accordance with an embodiment of the present disclosure. Computing system 100 may include hardware resources 110, a hypervisor 120, a virtual machine 130, a guest operating system 132, one or more user space processes 134A-C, and a network 140. It should be noted that other architectures for computing system 100 are possible, and that the implementations of the computing system utilizing embodiments of the disclosure are not necessarily limited to the specific architecture depicted.

Computing system 100 may be a single computing machine or multiple computing machines arranged in a homogenous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may include one or more hardware resources 110.

Hardware resources 110 may provide hardware features for performing computing tasks. In one example, one or more of the hardware resources may correspond to a physical device of computing system 100. In another example, one or more of the hardware resources may be provided by hardware emulation and the corresponding physical device may be absent from computer system. For example, computing system 100 may be a server machine that does not include a graphics device (e.g., graphics card) or includes a graphics device that does not support a particular hardware feature. Hypervisor 120 may provide the hardware feature of the hardware resource by emulating a portion of the hardware resource (e.g., provide a virtualized graphics device). The emulation of a portion of a hardware resource may be provided by hypervisor 120, virtual machine 130, host operating system (not shown), another hardware resource, or a combination thereof.

Hardware resources 110 may include a network interface device 112A, a graphics device 112B, a storage device 112C, central processing unit 112D, other physical or emulated devices, or combination thereof. Network interface device 112A may provide access to a network internal to the computing system 100 or external to the computing system 100 (e.g., network 140) and in one example may be a network interface controller (NIC). Graphics device 112B may provide graphics processing for the computing system 100 and/or one or more of the virtual machines 130. Storage device 112C may include any data storage that is capable of storing digital data, such as physical memory devices including volatile memory devices (e.g., RAM), non-volatile memory devices (e.g., NVRAM), other types of memory devices, or a combination thereof. Storage device 112C may include mass storage devices, such as solid-state storage (e.g., Solid State Drives (SSD)), hard drives, other persistent data storage, or a combination thereof. Central processing unit 112D may refer to devices capable of executing instructions encoding arithmetic, logical, or I/O operations. Central processing unit 112D may be a single core processor, which may be capable of executing one instruction at a time (e.g., single pipeline of instructions) or a multi-core processor, which may simultaneously execute multiple instructions. One or more of the hardware resources 110 may be combined or consolidated into one or more physical devices or may partially or completely emulated by hypervisor 120 as a virtual device.

Hypervisor 120 may also be known as a virtual machine monitor (VMM) and may provide virtual machine 130 with access to one or more features of the underlying hardware resources 110. In the example shown, hypervisor 120 may run directly on the hardware of computing system 100 (e.g., host machine). In other examples, hypervisor 120 may run on or within a host operating system (not shown). Hypervisor 120 may manage system resources, including access to hardware resources 110. Hypervisor 120, though typically implemented as executable code, may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc. Hypervisor 120 may support any number of virtual machines (e.g., a single VM, one hundred VMs, etc.).

Virtual machine 130 may execute guest executable code based on an underlying emulation of the hardware resources. Virtual machine 130 may support, for example, hardware emulation, full virtualization, para-virtualization, operating system-level virtualization, other virtualization technology, or a combination thereof. The guest executable code may include a guest operating system 132 that manages the execution of one or more user space processes 134A-C. Virtual machine 130 may include a guest operating system 132, which may include one or more of Microsoft® Windows®, Linux®, Solaris®, or other operating system.

Guest operating system 132 may include a data storage manager 135 that manages portions of guest data storage 136. Guest data storage 136 may be a portion of data storage that is allocated by hypervisor 120 for use by virtual machine 130. Data storage manager 135 may configure and manage access to different portions of guest data storage 136. Data storage manager 135 may segregate guest data storage 136 into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with diminished privileges (e.g., user space mode, user space privilege) as well as processes with enhanced privileges. In one example, the portion of guest data storage 136 associated with the enhanced privileges may be designated as kernel space and the portion of guest data storage 136 associated with the diminished privileges may be designated as user space. In other examples, there may be more or less than two portions of guest data storage 136.

Guest operating system 132 may manage the execution of one or more computing processes. A computing process may comprise one or more streams of execution for executing programmed instructions. The stream of instructions may include a sequence of instructions that can be executed by one or more processing devices. A computing process may be managed by a kernel or may be a part of kernel (not shown). In one example, a computing process may be an instance of a computer program that is being executed and may contain executable program code and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes may be associated with a particular level of privilege and each computing process may have a similar level of privilege or they may have different levels of privilege. The privilege levels of a computing process may be the same or similar to protection levels (e.g., processor protection rings) and may indicate an access level of a computing process to hardware resources (e.g., virtual or physical resources). There may be multiple different privilege levels assigned to the computing process. In one example, the privilege levels may correspond generally to either a kernel privilege level or a user space privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications. As shown in FIG. 1, guest operating system 132 may manage multiple computing processes as shown by user space processes 134A-C.

User space processes 134A-C may be computing processes that are associated with user space privileges. A user space process (e.g., user mode process, user privilege process) may have diminished privileges that provide the user space process access to a user space portion of guest data storage 136 without having access to a kernel space portion of guest data storage 136. In contrast, a kernel process may have enhanced privileges that provide the kernel process access to the user space portion and a kernel space portion of guest data storage 136. In one example, each of the user space processes 134A-C may be an application process, a system process, a background process (e.g., daemon or service), or a combination thereof. In one example, the privilege associated with a user space process may change during execution and a computing process executing in user space (e.g., user mode, user land) may be granted enhanced privileges by the guest operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

Data storage manager 135 may provide one or more of the user space processes 134A-C with access to portions of guest data storage 136. Data storage manager 135 may organize and configure guest data storage 136 into one or more memory locations 138A-C. In some embodiments, the user space processes 134A-C and/or the guest operating system 132 may use the data storage manager 135 to configure the memory locations 138A-C and to associate the memory locations 138A-C with the particular user space processes 134A-C. In some embodiments, the hypervisor 120 may configure and associate the memory locations 138A-C with the user space processes 134A-C. The memory locations 138A-C may be selected to correspond to hardware resources 110 and may be capable of storing requests 139A-C for one or more of hardware resources 110. User space processes that are able to modify a memory location may be capable of providing requests to be processed by the corresponding hardware resource. Data storage manager 135 may therefor enable guest operating system 132 to control which of the user space processes 134A-C have access to which hardware resources 110 by providing particular user space processes with access to particular memory locations. Data storage manager 135 may execute as part of a kernel, driver, application, other computer program, or a combination thereof. In one example, data storage manager 135 may provide a user space process with access to a memory location by mapping the memory location into a storage address space of the user space process. In another example, data storage manager 135 may provide a user space process with access to a memory location by modifying the permissions of the user space process, the memory location, other object, or a combination thereof.

Memory locations 138A-C may be logical or physical units of data storage for storing, organizing, or accessing data. A memory location may include a contiguous or non-contiguous sequence of bytes or bits. In one example, a memory location may be a virtual representation of underlying physical storage units, which may be referred to as physical storage blocks. Memory locations 138A-C may have a unit size that is the same or different from a physical block size provided by an underlying hardware resource. The block size may be a fixed-size, such as a particular integer value (e.g., 4 KB, 4 MB, 1 GB) or may be a variable-size that varies within any range of integer values. Each of the memory locations 138A-C may have the same block size or a different block size when compared to an adjacent memory location. Memory locations 138A-C may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, memory locations 138A-C may be a memory segment and each memory segment may correspond to an individual memory page, multiple memory pages, or a portion of a memory page. In other examples, each of the memory locations 138A-C may correspond to a portion (e.g., block, sector) of a mass storage device (e.g., hard disk storage, solid state storage).

Each of the memory locations 138A-C may correspond to a respective hardware resource of a set of hardware resources 110. In the example shown in FIG. 1, memory location 138A may correspond to network interface device 112A, memory location 138B may correspond to graphics device 112B, and memory location 138C may correspond to storage device 112C. A single user space process may have access to one or more of the memory locations 138A-C and may store a request in each of the respective memory locations 138A-C. The user space process may use the request to provide a hardware operation to the hypervisor 120 and subsequently to the hardware resource for execution. In one example, every request within a particular memory location may correspond to a particular hardware resource (e.g., network interface device). In another example, a single memory location may correspond to multiple different hardware resources (e.g., network interface device 112A and graphics device 112B).

In an example, a user space processes 134A and/or the guest operating system 132 may provide location data (e.g., address) of the memory location 138A and the type(s) of requests to be stored in the memory locations 138A to the hypervisor 120. The hypervisor 120 may associate a hypercall parameter (e.g., identifier, index value, etc.) with the location data of a memory location 138A-C and the type of request to be stored at the memory location 138A by the user space process 134A. The hypervisor 120 may transmit a notification including the hypercall parameter to the user space process 134A to cause the user space process 134A to use the hypercall parameter when invoking a hypercall to indicate to the hypervisor 120 which memory location to find the request in and the type of request stored in the memory location.

Requests 139A-C may be generated by one or more computing processes and may include request data for a particular hardware resource. The request data may include operation data and payload data. The operation data may be any data that indicates or identifies one or more operations (e.g., computing instructions, functions, commands, or tasks) and the payload data may indicate or identify input data, output data, other data, or a combination thereof. Each of the requests 139A-C may be formatted in a manner that can be interpreted and processed by hypervisor 120, one or more hardware resources 110, other devices, or a combination thereof. The request data may cause the hardware resource to perform one or more computations that modify data, store data, transmit data, receive data, other computing action, or a combination thereof. In the example shown in FIG. 1, there may be three different requests 139A-C and request 139A may include request data indicating a network operation for network interface device 112A, request 139B may include request data indicating a graphics operation for graphics device 112B, and request 139C may include request data indicating a storage operation for storage device 112C. One or more of the requests 139A-C may be analyzed and subsequently processed in response to signal 122.

Signal 122 may be initiated by guest code executed by virtual machine 130 and may cause hypervisor 120 to process one or more of the requests. The guest code (e.g., guest executable code) may include one or more guest operating systems, applications, drivers, other executable code, or a combination thereof. Signal 122 may be initiated by guest code that is being executed by guest operating system 132, user space processes 134A-C, a kernel process, other executable code, or a combination thereof. In the example shown in FIG. 1, user space process 134A may initiate the transmission of signal 122 from virtual machine 130 to hypervisor 120. User space process 134A may initiate the signal transmission without involving the kernel of the guest operating system 132 and therefore may bypass the kernel and communicate directly with the hypervisor. In another example, the user space process 134A may initiate the transmission of signal 122 but the kernel may be involved with transmitting the signal 122 to hypervisor 120. In either example, signal 122 may cause a processing device of computing system 100 to switch from executing user space process 134A to executing hypervisor 120.

Signal 122 may be the result of a hypercall that is invoked by a user space process of guest operating system 132. The hypercall may be a command (e.g., a CPU command or instruction) that causes an immediate switch from the guest executable code to the hypervisor when executed. The switch may occur without executing any guest kernel configurable security checks by the processor (e.g., CPU), which may enable the hypercall to be fast (e.g., less processing cycles) but less secure. The hypercall may vary depending on the underlying hardware architecture and its instruction set architecture (ISA) and may involve the execution of a VMCALL instruction on an Intel® processors, a VMMCALL instruction on AMD® processors, a HVC instruction on ARM® processors, or other instruction on another processor. The hypercall may be associated with a particular memory location (e.g., 138A) and/or request type and the memory location may include one or more requests (e.g., 139A). The user space process (e.g., 134A) may also store the hypercall parameter in a storage field (e.g., general purpose register) when invoking the hypercall to enable the hypervisor 120 to find the request (e.g., 139A) stored in the memory location (e.g., 138A) and to determine whether the request (e.g., 139A) is of the proper type for the memory location (e.g., 138A). The association of the hypercall with a memory location and/or request type is discussed in more detail below in regards to FIG. 2.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
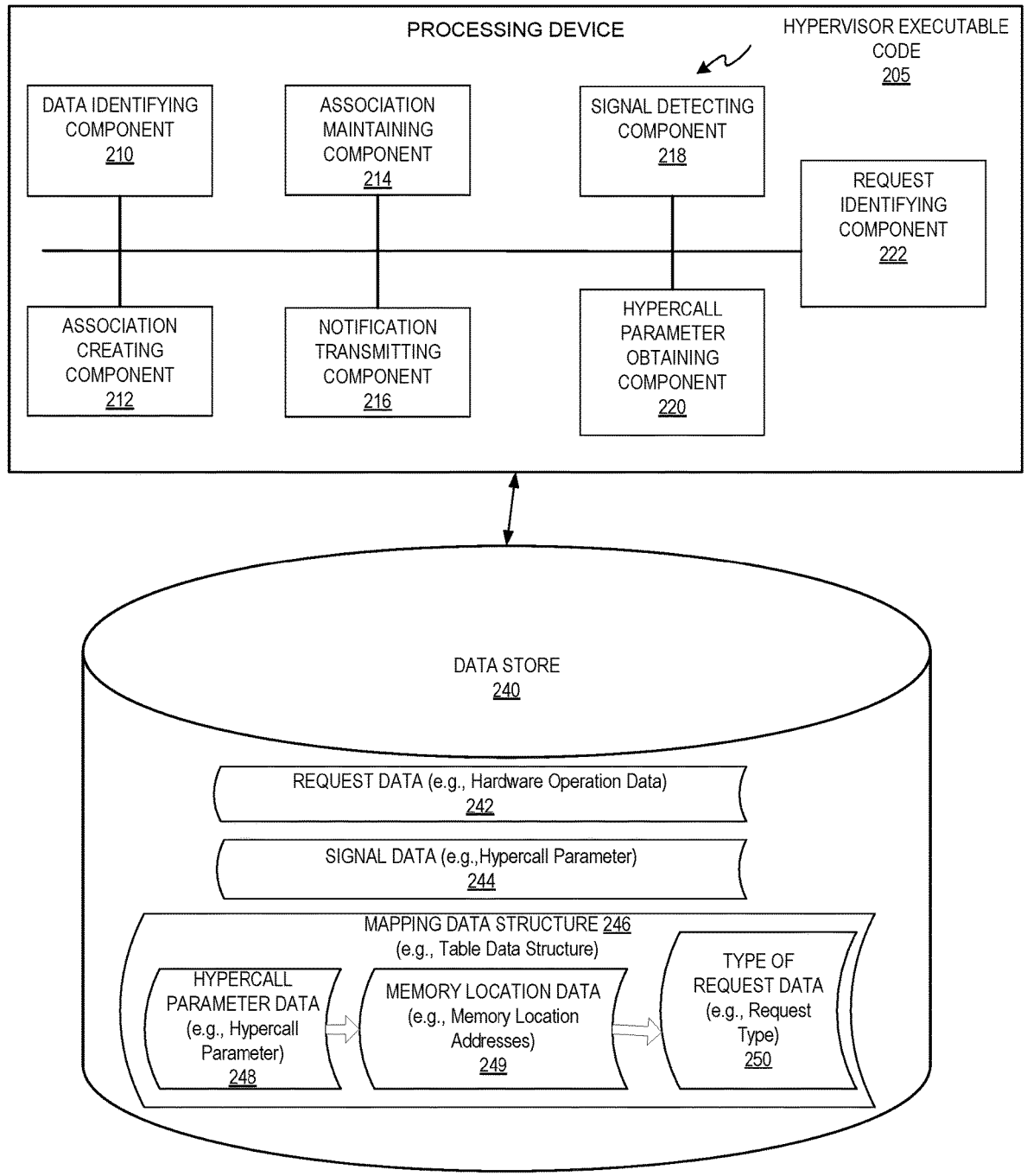
FIG. 2 depicts a block diagram of an example computer system in accordance with one or more aspects of the present disclosure.

FIG. 2 is a block diagram illustrating an example computer system 200 in accordance with one or more aspects of the present disclosure. Computer system 200 may be the same or similar to computing system 100 of FIG. 1 and may include one or more processing devices and one or more memory devices. In the example shown, the processing device may execute hypervisor executable code 205 that includes a data identifying component 210, an association creating component 212, an association maintaining component 214, a notification transmitting component 216, a signal detecting component 218, a hypercall parameter obtaining component 220, and a request identifying component 222. Further, the hypervisor executable code 205 may provide access to a data store 240. More or less components or modules may be included without loss of generality. For example, two or more of the components may be combined into a single component, or features of a component may be divided into two or more components. In one implementation, one or more of the components may reside on different computing devices (e.g., a client device and a server device).

The features discussed below in regards to some of the components (e.g., 210, 212, 214, 216) may be executed by hypervisor executable code 205 during a setup phase. The setup phase may occur at any point in time prior to the user space process initiating a signal (e.g., prior to execution of the hypercall) associated with a request. The setup phase may enable the hypervisor executable code 205 to indicate, to the hypervisor, which memory locations should be accessed or searched when a subsequent signal is received. In one example, the setup phase may occur before, during, or after an initialization of the virtual machine, the guest operating system, a user space process, or a combination thereof. Other features discussed below in regards to some of the components (e.g., 218, 220, and 222) may be executed by the hypervisor executable code 205 during an execution phase. The execution phase may occur upon the hypervisor detecting the signal when the user space process invokes the hypercall associated with a request.

Data identifying component 210 may enable a processing device to identify location data (e.g., address) of the memory location 138A-C associated with a user space process 134A-C operating on the virtual machine 130 and/or a type of a request 139A-C to be stored at the memory location 138A-C by the user space process 134A-C when the user space process 134A-C invokes the hypercall 122. In some embodiments, the user space process 134A-C and/or the guest operating system 132 may configure the memory location 138A-C and associate the memory location 138A-C with the user space process 134A-C and/or with a type of request to be stored at the memory location 138A-C. The user space process 134A-C and/or the guest operating system 132 may transmit the location data of memory location 138A-C and/or the type of request 139A-C to be stored in the memory location 138A-C to the hypervisor 120. In another example, the hypervisor 120 may configure and associate the memory location 138A-C with the user space process 134A-C and/or the request type, or the hypervisor may cause the memory location 138A-C to be configured and associated with the user space process 134A-C and/or the request type. In such an instance, the hypervisor 120 identifies the location data of the memory location 138A-C and/or the type of the request 139A-C to be stored when the memory location 138A-C is configured.

In one example, a particular memory location may be associated with a particular hardware resource (e.g., a single hardware resource). In another example, a particular memory location may be associated with multiple hardware resources. The multiple hardware resources may include all hardware resources managed by the hypervisor 120 or a particular set of hardware resources managed by the hypervisor (e.g., subset of all hardware resources). Thus, certain memory locations may be associated with certain types of requests to be stored in the certain memory locations by the user space processes 134A-C.

Association creating component 212 may enable a processing device to associate a hypercall parameter with the location data of the memory location 138A-C and/or the type of the request 139A-C to be stored at the memory location 138A-C. The hypercall parameter may be generated by the hypervisor 120 and may include any suitable identifier (e.g., number, an index value in a data table, etc.). The association may be stored in a mapping data structure 246.

Mapping data structure 246 may be any data structure that is capable of storing and organizing hypercall parameter data 248 and storage location data 249. In one example, mapping data structure 246 may be accessible to the hypervisor 120 without being accessible to the virtual machine 130. In another example, mapping data structure 246 may be accessible to the hypervisor 120 and to the virtual machine 130 and the virtual machine 130 may or may not be able to modify mapping data structure 246. In either example, mapping data structure 246 may include one or more tables, two dimensional arrays, lists, links, other data structure, or a combination thereof.

Hypercall parameter data 248 may correspond to a particular memory location and to the respective hardware resource, as well as the type of request. The index data may include numeric or non-numeric values that are mapped to memory location and/or the type of request. For example, hypercall parameter data 248 may include multiple integer values and each of the multiple integer values may correspond to a location of one of the memory locations and/or to a type of request. In one example, hypercall parameter data 248 may include an index value of the mapping data structure 246 that is mapped to the memory location data (e.g., a memory location address) 249 of a memory location 138A where a user space process 134A is to store a request 139A. In some embodiments, the mapping data structure 246 may also include a mapping of the hypercall parameter data 248 to a type of request data 250 that indicates the request type (e.g., network operation, graphics operation, storage operation, etc.) to be stored at the memory location 138A. This may enable the hypervisor 120 to determine whether the type of the request associated with the hypercall invoked by the user space process is permitted to be executed.

The storage location data 249 may be a location in guest data storage that is accessible by the virtual machine 130 and by the hypervisor 120. In one example, the memory location may include a portion of guest memory and storage location data 249 may include one or more memory addresses within guest memory. The memory addresses may be physical addresses, virtual addresses, other addresses, or a combination thereof and may be associated with the beginning, end, or other location of a storage unit. In another example, the memory location may include a portion of a mass storage device (e.g., secondary storage) and the storage location data 249 may include one or more identifiers of a file system object, database object, other object, or a combination thereof. The mass storage device may include a hard disk drive (HDD), a solid-state drive (SSD), other persistent data storage, or a combination thereof.

Association maintaining component 214 may enable a processing device to maintain the association between the hypercall parameter data 248 and the type of request and/or the memory location 138A-C at which the user space process 134A is authorized to store a request 139A associated with the hypercall when invoking the hypercall. As depicted, the association may be maintained in the mapping data structure 246 of the data store 240.

Notification transmitting component 216 may enable a processing device to transmit a notification including the hypercall parameter to the user space process 134A-C to cause the user space process 134A-C to use the hypercall parameter when invoking the hypercall to indicate to the hypervisor 120 that the request 139A is stored at the memory location 138A and/or to indicate that the type of the request 139A is stored at the memory location 138A.

Signal detecting component 218 may enable a processing device to detect that the user space process 134A-C has invoked the hypercall. When the user space process 134A-C invokes the hypercall and causes the signal to be transmitted to the hypervisor 120, the user space process 134A-C may store signal data 244 (e.g., hypercall parameter) in a storage field (e.g., general purpose register of the processing device).

For example, signal data 244 may include a hypercall parameter provided by the hypervisor 120 and used by the hypervisor to identify the memory location that includes a request available for processing. Signal data 244 may be included internal to the signal, external to the signal, or a combination thereof. For example, a first portion of signal data 244 may be included within the signal and a second portion of signal data 244 may be stored at a specific storage field that the processing device or hypervisor checks in response to the signal. The specific storage field may include specific processor registers, memory blocks, mass storage objects (e.g., files, database records), storage units, other data storage location, or a combination thereof.

Signal data 244 may include data that a hypervisor can analyze to indirectly or directly identify the storage unit that has the request. Signal data 244 may directly identify the storage unit when signal data 244 includes data that a hypervisor can use to directly identify a particular memory location (e.g., storage location data 249). Signal data 244 may indirectly identify the storage unit when signal data 244 includes data that a hypervisor can resolve to identify one or more memory locations. The hypervisor may resolve the data using mapping data structure 246, which may include a mapping between hypercall parameter data 248 (e.g., hypercall parameter) and a memory location data (e.g., memory location address). For example, the hypercall parameter may include an index value and the hypervisor may access a portion of mapping data structure 246 that corresponds to the index value to determine the address of a memory location.

Further, when initiating the signal and invoking the hypercall, the user space process 134A-C may attempt to store request data 242 (e.g., a request, such as hardware operation data) at the appropriate memory location 138A-C designated for the type of request desired by the user space process 134A-C. The attempt may cause one or more security checks to be performed, which may involve the guest kernel, the hypervisor 120, a hardware resource (e.g., CPU, memory controller, other processing device), other entity, or a combination thereof. The security checks may determine whether the user space process managed by the guest operating system is authorized (or unauthorized) to modify the memory location. In some embodiments, this security check may be initiated when the user space process invokes the hypercall. This security check may be advantageous because user space processes are traditionally un-privileged processes yet often need the ability to signal the hypervisor 120 to cause hardware operations. By storing the requests (e.g., hardware operation requests) in memory locations, the security check native to a computing system can function to prohibit or authorize a user space process to cause a hypervisor 120 to execute a request associated with a hypercall. If the hypervisor 120 finds a request stored in a particular memory location associated with a user space process, the hypervisor 120 can determine that the user space process was authorized to store that particular request in the memory location, thereby enhancing security of enabling a user space process to invoke hypercalls.

The request may include the request data 242 for a particular hardware resource. Request data 242 may include operation data and payload data. The operation data may be any data that indicates or identifies one or more operations (e.g., computing instructions, functions, commands, or tasks) and the payload data may indicate or identify input data, output data, other data, or a combination thereof. Each request may be formatted in a manner that can be interpreted and processed by the hypervisor 120, one or more hardware resources 110, other devices, or a combination thereof. Request data 242 may indicate to the hypervisor 120 which hardware resource to use for the request and provide the data necessary to enable the hypervisor 120 to cause the hardware resource to perform one or more computations that modify data, store data, transmit data, receive data, other computing action, or a combination thereof.

Initiating the signal may cause the guest operating system to bypass a kernel of the guest operating system and signal to the hypervisor that a request is stored and waiting to be processed. The signal may initiate a trap (e.g., hardware trap) that causes the processing device executing the user space process to switch from executing the guest executable code of the virtual machine to executing the hypervisor. The switch may be a context switch that transitions execution of the processing device from a guest user space process to a hypervisor process. In one example, the signal may be initiated by the user space process by executing a hypercall and be directly transmitted to the hypervisor without causing the guest kernel to execute. In another example, the signal may be initiated by the user space process and may be indirectly transmitted to the hypervisor. The indirect transmission may involve the user space process using a system call to communicate the signal to the guest kernel and the guest kernel communicating the signal to the hypervisor (e.g., via a hypercall). In either example, the hypercall may be associated, via the hypercall parameter data 248, with a particular memory location storing a request before, during, or after the initiation of the signal.

As discussed above, the signal may be a hypercall and prior to executing the hypercall the guest executable code 232 (e.g., user space process) may update one or more of the specific fields (e.g., registers of the processing device). The hypercall may cause a trap (e.g., hardware trap) that switches the execution of the processing device from the guest executable code to the hypervisor. The hypervisor may respond to the trap by checking the one or more specific fields to determine that the trap was in response to a hypercall and to determine that the hypercall was a predefined type (e.g., wake hypercall). In response to the trap being associated with the predefined type of hypercall, the hypervisor may access another specific field that includes a portion of signal data 244 (e.g., an index value). The hypervisor may then resolve the signal data 244 to a particular memory location using mapping data structure 246. The hypervisor may access the memory location to retrieve and validate the request (e.g., check validation bit). As discussed further below, the hypervisor may process the request by interpreting the request data to determine a hardware operation and cause a hardware resource to execute the operation in view of the request.

Hypercall parameter obtaining component 220 may enable a processing device to obtain the hypercall parameter from the storage field. For example, the hypervisor may respond to the trap by checking the one or more specific fields to determine that the trap was in response to a hypercall and to determine that the hypercall was a predefined type (e.g., wake hypercall). In response to the trap being associated with the predefined type of hypercall, the hypervisor may access another specific field (e.g., register) that includes a portion of signal data 244 (e.g., a hypercall parameter). The hypervisor may then resolve the signal data 244 to a particular memory location using mapping data structure 246.

Request identifying component 222 may enable a processing device to obtain the request 139A-C from the memory location 138A-C in view of the association between the hypercall parameter and the memory location 138A-C. For example, the hypervisor 120 may use the hypercall parameter to lookup the memory location address in the mapping data structure 246. In some embodiments, the hypervisor 120 may determine whether the type of the request 139A-C stored in the memory location 138A-C is permitted to be executed in view of the association between the hypercall parameter and the type of the request 139A-C. The hypervisor may validate the request (e.g., check valid bit) is new. As discussed further below, the hypervisor may process a new request by interpreting the request data to determine a hardware operation and cause a hardware resource to execute the operation in view of the request.

Figure 3:
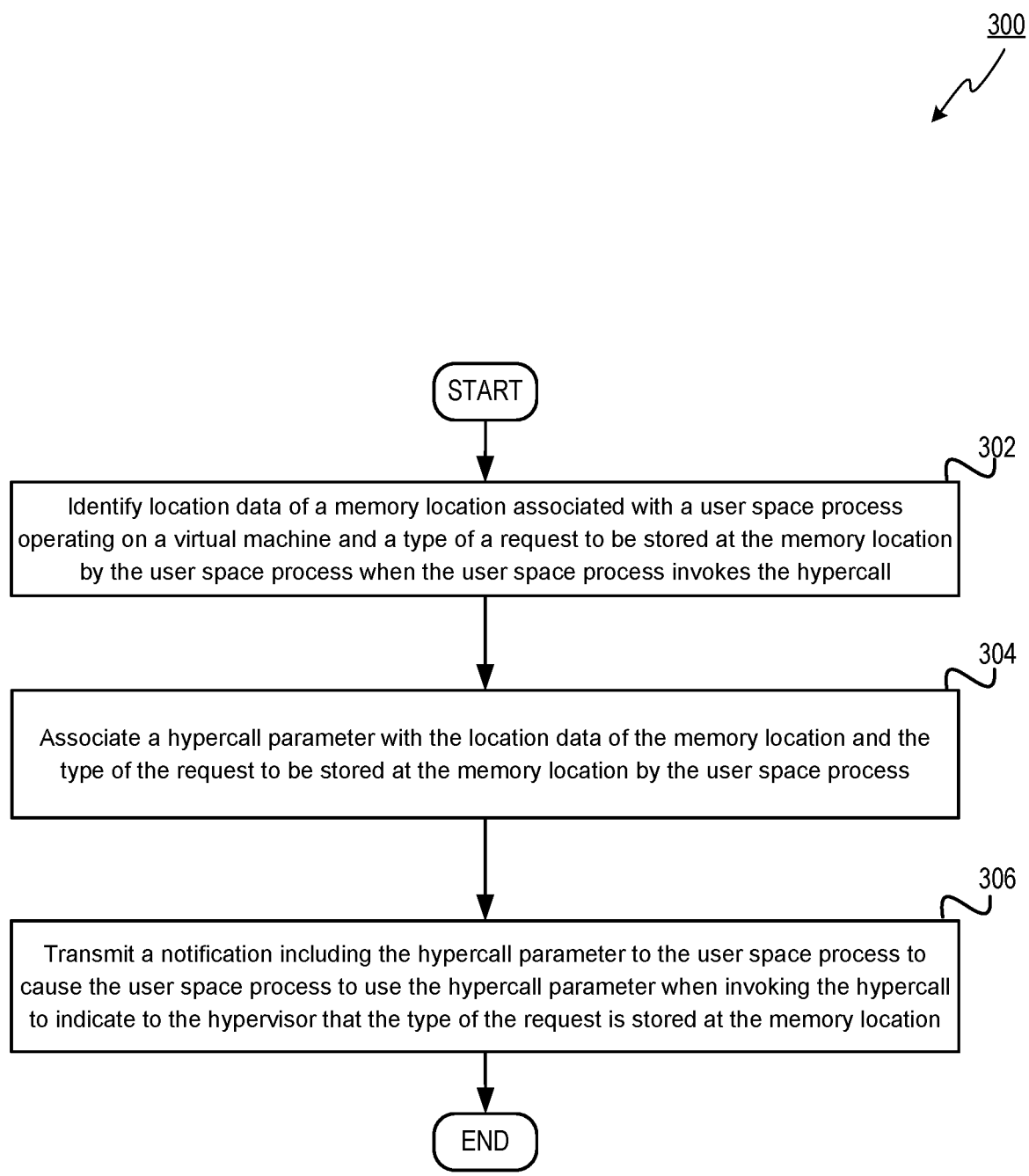
FIG. 3 depicts a flow diagram of an example method for a hypervisor to prepare a secure environment for execution of a hypercall invoked by a guest user space process, in accordance with one or more aspects of the present disclosure.

FIG. 3 depicts a flow diagram of an example method 300 for a hypervisor 120 to prepare a secure environment for execution of a hypercall invoked by a guest user space process 134A-C, in accordance with one or more aspects of the present disclosure. Method 300 and each of its individual functions, routines, subroutines, or operations may be performed by one or more processors of a computer device executing the method. In certain implementations, method 300 may be performed by a single processing thread of a guest operating system. Alternatively, method 300 may be performed by two or more processing threads executing on the computer device and each thread may execute one or more individual functions, routines, subroutines, or operations of the method. In an illustrative example, the processing threads implementing method 300 may be synchronized (e.g., using critical sections, semaphores, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a processing device executing the hypervisor executable code 205 and may begin at block 302.

At block 302, a processing device executing a hypervisor may identify location data (e.g. memory location address) of a memory location associated with a user space process operating on a virtual machine and a type of a request to be stored at the memory location by the user space process when the user space process invokes the hypercall. The hypervisor may identify the location data and the type of the request to be stored at the memory location when the hypervisor receives the location data and the type of the request from the user space process and/or the guest operating system. In another embodiment, the hypervisor may identify the location data and the type of the request to be stored at the memory location when the hypervisor configures the memory location and associates the memory location with the user space process.

At block 304, the processing device executing the hypervisor may associate a hypercall parameter with the location data of the memory location and the type of the request to be stored at the memory location by the user space process. The hypercall parameter is to be used by the hypervisor to determine which memory location the request is stored in and whether the type of the request associated with the hypercall invoked by the user space process is permitted to be executed. The association may be created in the mapping data structure 246 of FIG. 2. The hypercall parameter may be any suitable identifier and may be generated by the hypervisor responsive to identifying the location data of the memory location and/or the type of the request to be stored at the memory location. In one embodiment, the hypercall parameter includes an index value corresponding to a table entry indicating at least a storage address of the memory location and/or the type of the request to be stored at the memory location.

At block 306, the processing device executing the hypervisor may transmit a notification including the hypercall parameter to the user space process to cause the user space process to use the hypercall parameter when invoking the hypercall to indicate to the hypervisor that the type of the request is stored at the memory location. The user space process may receive the hypercall parameter and may store the hypercall parameter in a storage field when invoking a hypercall associated with a request. The user space process may also store the request at the memory location associated with a type of the request. A security check may be performed when the user space process invokes the hypercall and prior to allowing the user space process to store the request in the memory location. The request may be an operation for a hardware resource managed by the hypervisor, such as a network interface device, a graphics device, or a storage device.

The processing device executing the hypervisor may detect that the user space process has invoked the hypercall. The processing device may further obtain the hypercall parameter from the storage field. The processing device may then obtain the request from the memory location in view of the association between the hypercall parameter and the memory location. Also, the processing device may determine whether the type of the request stored in the memory location is permitted to be executed in view of the association between the hypercall parameter and the type of the request. If, for example, the memory location is configured to store requests for network operations and a request for a graphics operation is stored in the memory location, the hypervisor may not execute the request. An improper type of request stored in a memory location may be a sign of a malicious application trying to cause undesirable behavior. If the type of the request stored in the memory location matches the type of request that the memory location is configured to store, then the hypervisor may perform additional validations.

For example, the hypervisor may determine whether the request is a new request, and is not an old request that has already been processed. An old request stored in the memory location may be a sign of a malicious application trying to cause undesirable behavior. To determine whether the request is new (e.g., valid), the hypervisor may check a valid bit associated with the request. The valid bit may be set to a value indicating that the request is valid by the user space process.

It should be understood that the method 300 may be used to prepare a secure environment for any suitable number of memory locations and user space processes to invoke hypercalls. For example, the hypervisor may identify second location data of a second memory location associated with the user space process operating on the virtual machine and a second type of a second request to be stored at the second memory location by the user space process when the user space process invokes the hypercall. The hypervisor may associate a second hypercall parameter with the second location data of the second memory location and the second type of the second request to be stored at the second memory location by the user space process. The second hypercall parameter to be used to determine whether the second type of the second request associated with the hypercall invoked by the user space process is permitted to be executed. The hypervisor may transmit a second notification comprising the second hypercall parameter to the user space process to cause the user space process to use the second hypercall parameter when executing the hypercall to indicate to the hypervisor that the second type of the second request is stored at the second memory location.

Figure 4:
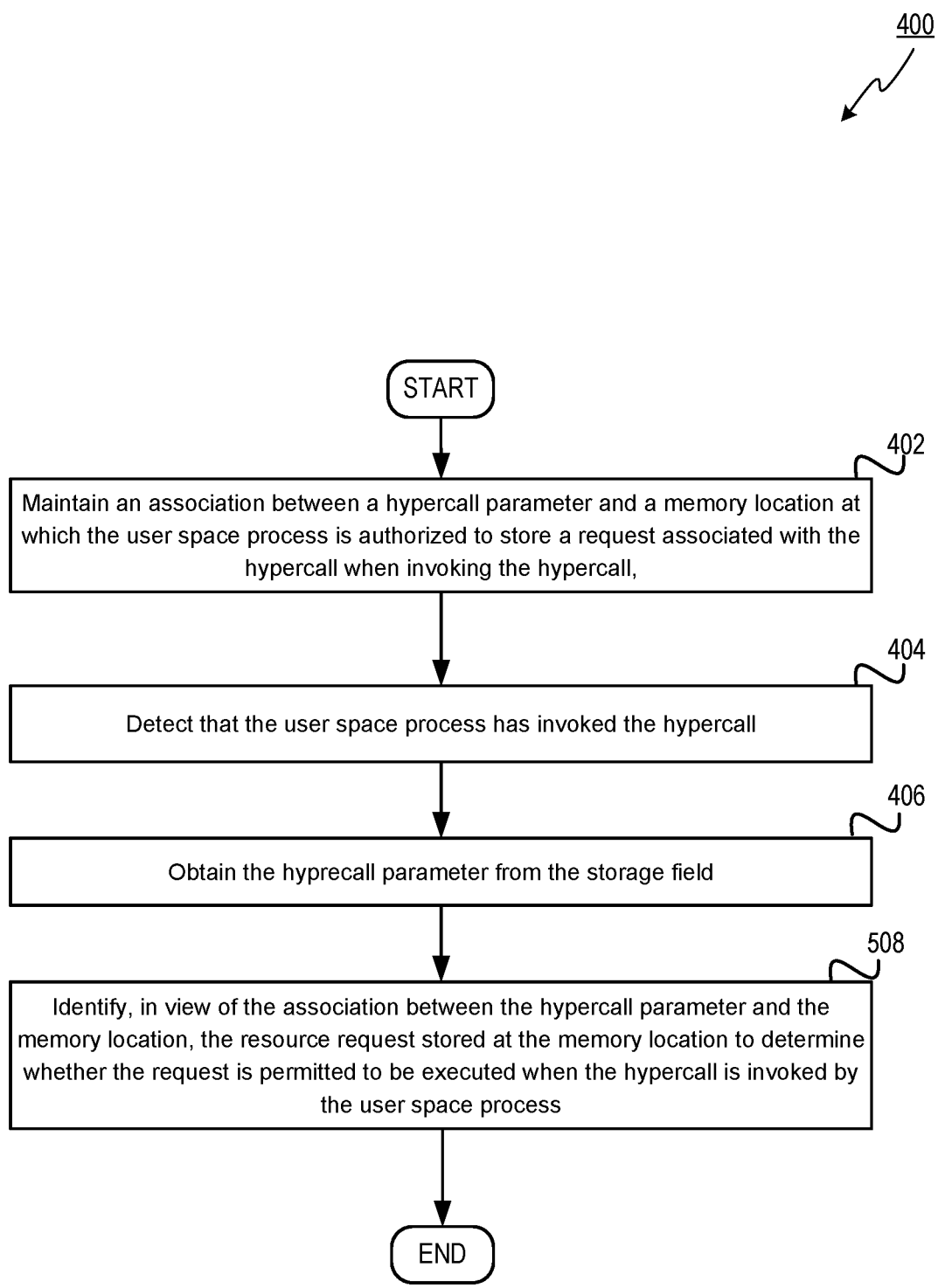
FIG. 4 depicts a flow diagram of an example method for enabling a hypervisor to provide a secure environment to receive requests from a guest user space process, in accordance with one or more aspects of the present disclosure.

FIG. 4 depicts a flow diagram of an example method 400 for enabling a hypervisor to provide a secure environment to receive requests from a guest user space process, in accordance with one or more aspects of the present disclosure. Method 400 may be similar to method 300 and may be performed in the same or a similar manner as described above in regards to FIG. 3. Method 400 may be performed by a processing device executing the hypervisor executable code 205 and may begin at block 402.

At block 402, a processing device executing a hypervisor may maintain, an association between a hypercall parameter and a memory location at which the user space process is authorized to store a request associated with the hypercall when invoking the hypercall. The user space process may store he hypercall parameter at a storage field when invoking the hypercall. The storage field may be a general purpose register of the processing device executing the hypervisor and the virtual machine. The storage field may be accessible to both the user space process of the virtual machine and the hypervisor.

At block 404, the processing device executing the hypervisor may detect that the user space process has invoked the hypercall. The hypervisor may receive a signal that may be initiated by the user space process when the user space process invokes a hypercall. The hypercall may cause the processing device to switch from executing the user space process to executing the hypervisor. In one example, the signal may cause a context switch from the guest executable code running on the virtual machine to the hypervisor. Before, during, or after initiating the hypercall, the user space process may store a request in the memory location and may update the storage field of the processing device to include the hypercall parameter indicating that the hypercall is associated with the memory location storing the request. The request may include an operation for a hardware resource, such as a network interface device, a graphics device, a storage device, other physical or emulated device, or a combination thereof. In one example, the hardware resource managed by the hypervisor may include a hardware resource emulated by the hypervisor.

At block 406, the processing device executing the hypervisor may obtain the hypercall parameter from the storage field. At block 408, the processing device executing the hypervisor may identify, in view of the association between the hypercall parameter and the memory location and/or the request type, the request stored at the memory location to determine whether the request is permitted to be executed when the hypercall is invoked by the user space process. The hypervisor may access the association stored in the mapping data structure 246 of FIG. 2. In some embodiments, determining whether the request is permitted to be executed may include the hypervisor determining whether the request stored at the memory location is of a type that the user space process indicated will be stored at the particular memory location. In some embodiments, determining whether the request is permitted to be executed may include the hypervisor determining whether a valid bit associated with the request is set to a value indicating that the request is valid.

If the hypervisor determines to not execute the request, the hypervisor may provide a notification to the user space process indicating that the request was not executed. If the hypervisor determines to execute the request, the hypervisor may execute the request and provide a notification to the user space process that the request associated with the hypercall has been executed. The notification may include storing data (e.g., setting or clearing a valid bit) in a storage field (e.g., general purpose register).

Figure 5:
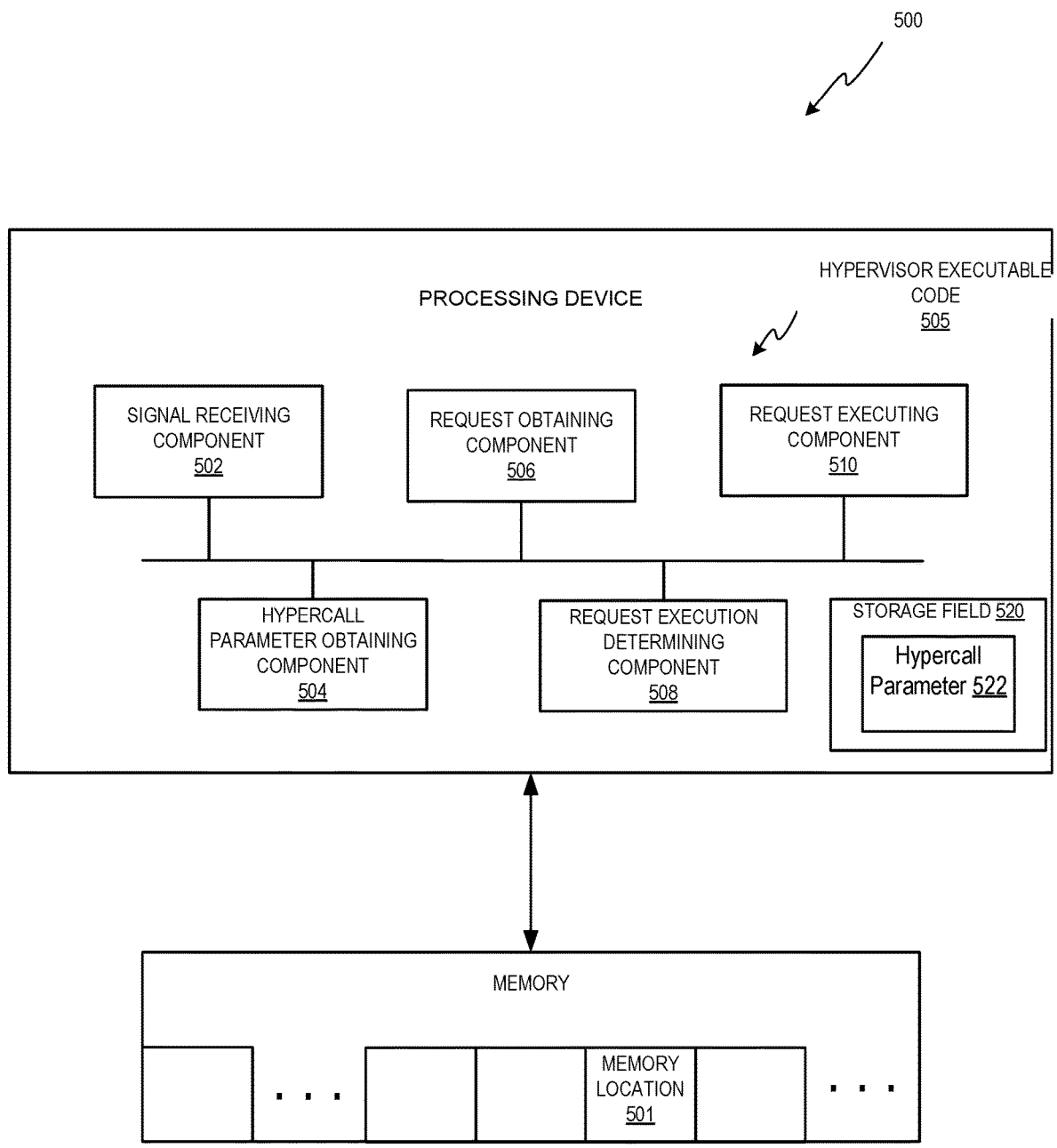
FIG. 5 depicts a block diagram of another example computer system in accordance with one or more aspects of the present disclosure.

FIG. 5 depicts a block diagram of another computer system 500 operating in accordance with one or more aspects of the present disclosure. Computer system 500 may be the same or similar to computing system 100 of FIG. 1 and/or computing system 200 of FIG. 2 and may include one or more processing devices and one or more memory devices. In the example shown, the processing device may execute the hypervisor executable code 505 that includes a signal receiving component 502, a hypercall parameter obtaining component 504, a request obtaining component 506, a request execution determining component 508, and a request executing component 510. The processing device may include a storage field 520 (e.g., a general purpose register). Further, the hypervisor executable code 505 may provide access to a memory including a memory location 501 that is configured to be accessed by one or more authorized user space processes and is configured to store one or more particular types of requests (e.g., network operations, graphics operations, etc.). More or less components may be included without loss of generality. For example, two or more of the components may be combined into a single component, or features of a component may be divided into two or more components. In one implementation, one or more of the components may reside on different computing devices (e.g., a client device and a server device).

The features discussed below in regards to the components 502, 504, 506, 508, and 510 may be executed by the hypervisor executable code 205 during an execution phase. The execution phase may occur upon the hypervisor detecting the signal when the user space process invokes the hypercall associated with a request.

Signal receiving component 502 may enable a processing device to receive a signal initiated by a user space process of the virtual machine. The signal may initiate a trap (e.g., hardware trap) that causes the processing device executing the user space process to switch from executing the guest executable code of the virtual machine to executing the hypervisor. The switch may be a context switch that transitions execution of the processing device from a guest user space process to a hypervisor process. In one example, the signal may be initiated by the user space process by invoking a hypercall. The hypercall may be associated with a particular memory location storing a request before, during, or after the initiation of the signal.

The user space process may store a request in the memory location 501 when invoking the hypercall. The request may include an operation for a hardware resource, such as a network interface device, a graphics device, a storage device, other physical or emulated device, or a combination thereof. The user space process may also store a hypercall parameter 522 in the storage field 520 when invoking the hypercall. The hypercall parameter may have been previously provided to the user space process by the hypervisor.

Hypercall parameter obtaining component 504 may enable a processing device to obtain the hypercall parameter 522 associated with the hypercall from the storage field 520. The user space process may store the hypercall parameter 522 in the storage field 520 to enable the hypervisor to identify, in view of the association between the hypercall parameter and the memory location and the request type, the request stored at the memory location to determine whether the request is permitted to be executed when the hypercall is invoked by the user space process.

Request obtaining component 506 may enable a processing device to use the hypercall parameter to identify the memory location 501 storing the request associated with the hypercall invoked by the user space process and to obtain the request from the memory location 501. The hypervisor may maintain an association between the hypercall parameter 522 and the location of the memory location where the request is stored and a type of request to be stored in the memory location. For example, the processing device may use the association stored in the mapping data structure 246 of FIG. 2 to determine the location (memory location address) of the memory location 501 in view of the hypercall parameter.

Request execution determining component 508 may enable a processing device to determine whether to permit execution of the request associated with the hypercall. The processing device may determine whether the type of the request stored at the memory location 501 is of a type that the user space process indicated is to be stored at the memory location 501. For example, if the request is for a network operation and the user space process indicated that graphics operations are to be stored and associated with the memory location 501, then the processing device may not permit execution of the request. If the request matches the type indicated to be stored in the memory location 501, the processing device may permit execution of the request. Additionally, the processing device may determine whether the request is new (e.g., valid) before permitting execution of the request. In some embodiments, the processing device may check whether a valid bit associated with the request is set to a value indicating that the request is valid.

Request executing component 510 may enable a processing device to execute or not execute the request. If the request is determined to be of a proper type and/or the request is new (e.g., valid), then the processing device may execute the request. The processing device may provide a notification to the user space process when the request is not executed. Also, the processing device may provide a notification to the user space process when the request is executed. The notification may include the hypervisor storing data (e.g., modifying a valid bit associated with the request) in the memory location where the request is stored, transmitting a message to the user space process, or the like.

Figure 6:
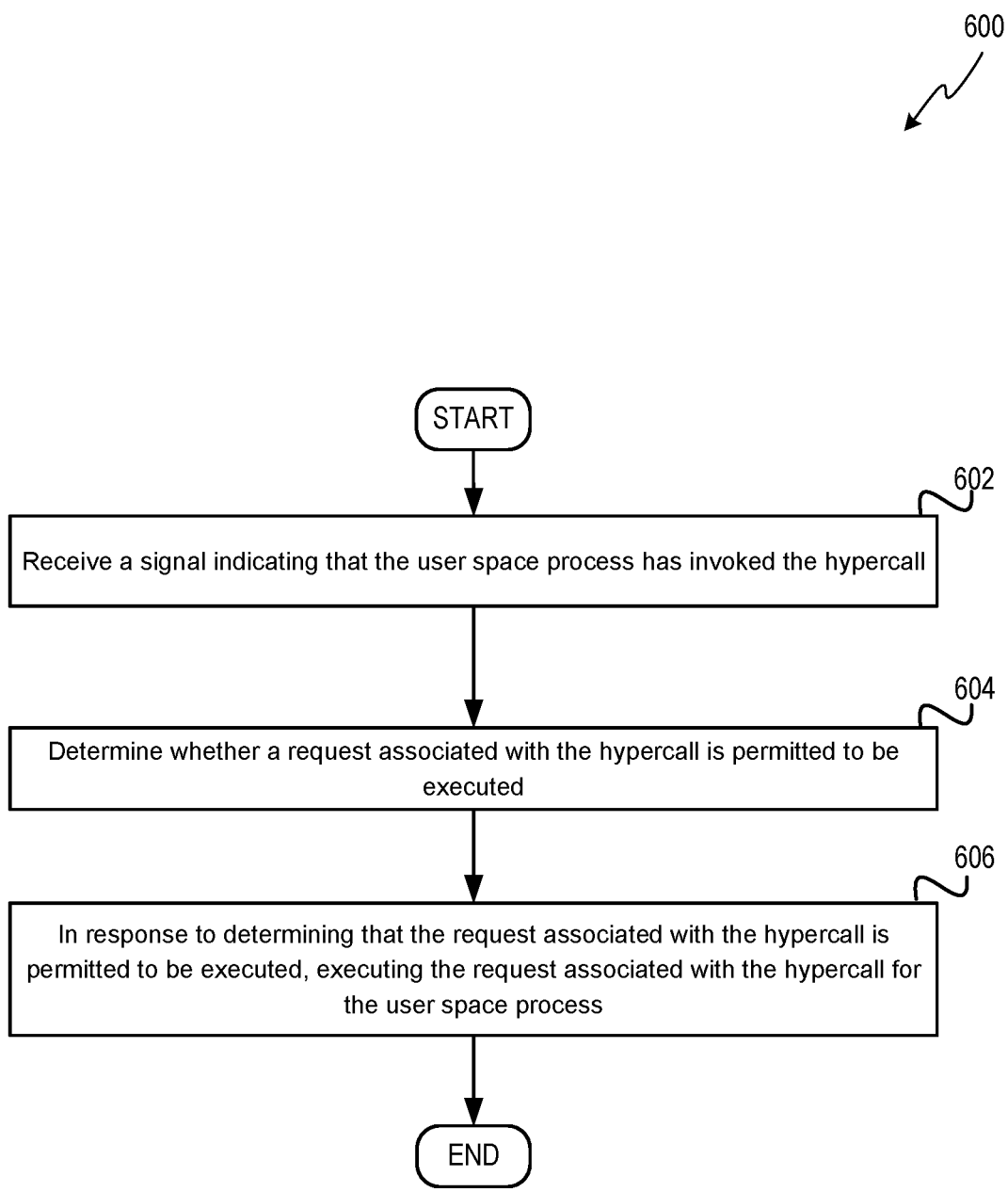
FIG. 6 depicts a flow diagram of an example method for a hypervisor to securely execute a request associated with a hypercall invoked by a guest user space process operating on a virtual machine, in accordance with one or more aspects of the present disclosure.

FIG. 6 depicts a flow diagram of an example method 600 for a hypervisor to securely execute a request associated with a hypercall invoked by a guest user space process operating on a virtual machine, in accordance with one or more aspects of the present disclosure. Method 600 may be similar to method 300 and may be performed in the same or a similar manner as described above in regards to FIG. 3. Method 600 may be performed by a processing device executing the hypervisor executable code 505 and/or 205 and may begin at block 602.

At block 602, a processing device executing a hypervisor may receive a signal indicating that the user space process has invoked the hypercall. When the user space process invokes the hypercall and initiates the signal, the user space process may store the request at a memory location associated with the user space process and/or the type of the request. The memory location may be accessible to the user space process and the hypervisor. One or more security checks may be performed to ensure the user space process is authorized when the user space process invokes the hypercall prior to allowing the user space process to store the request at the memory location. Also, when the user space process invokes the hypercall and initiates the signal, the user space process may store the hypercall parameter in a storage field accessible to the user space process and the hypervisor.

Subsequent to receiving the signal, the processing device may obtain the hypercall parameter from the storage field. The hypervisor may maintain an association that was created by the hypervisor during the setup phase between the hypercall parameter and the location (e.g., address) of the memory location where the request is stored. The hypervisor may also maintain an association between the hypercall parameter and a type of request to be stored in the particular memory location. The associations may be maintained in a mapping data structure 246 of FIG. 2.

At block 604, the processing device executing the hypervisor may determine whether the request associated with the hypercall is permitted to be executed. In some embodiments, determining whether the request is permitted to be executed includes searching the memory location associated with the user space process for the request associated with the hypercall. Identifying the request in the memory location may provide an indication to the hypervisor that the request is from the user space process since the user space process needs to be authorized to access the particular memory location.

In some embodiments, determining whether the request is permitted to be executed may include determining whether the type of the request stored in the memory location matches a type of request that the user space process indicated is to be stored in the memory location. In another embodiment, the processing device may determine whether a valid bit associated with the request is set to a value indicating that the request is valid.

At block 606, the processing device may, in response to determining that the request associated with the hypercall is permitted to be executed, execute the request associated with the hypercall for the user space process. The processing device may determine that the request associated with the hypercall is permitted to be executed when the request is found in the memory location, the request is of a proper type, and/or the request is new (e.g., valid). These determinations, among other things, may provide a secure environment to enable the hypervisor to prohibit or permit executing a hypercall invoked by a user space process operating on a virtual machine.

When the request is executed, the processing device may provide a notification to the user space process that the request associated with the hypercall has been executed. The notification may include the processing device storing data (e.g., modifying a valid bit associated with the request) in the a storage field and/or the memory location to indicate to the user space process that the request associated with the hypercall has been executed. In some embodiments, the hypervisor may provide the notification by transmitting a message to the user space process indicating that the request is executed. After the request is executed, control may transition back to the user space process to resume execution.

Figure 7:
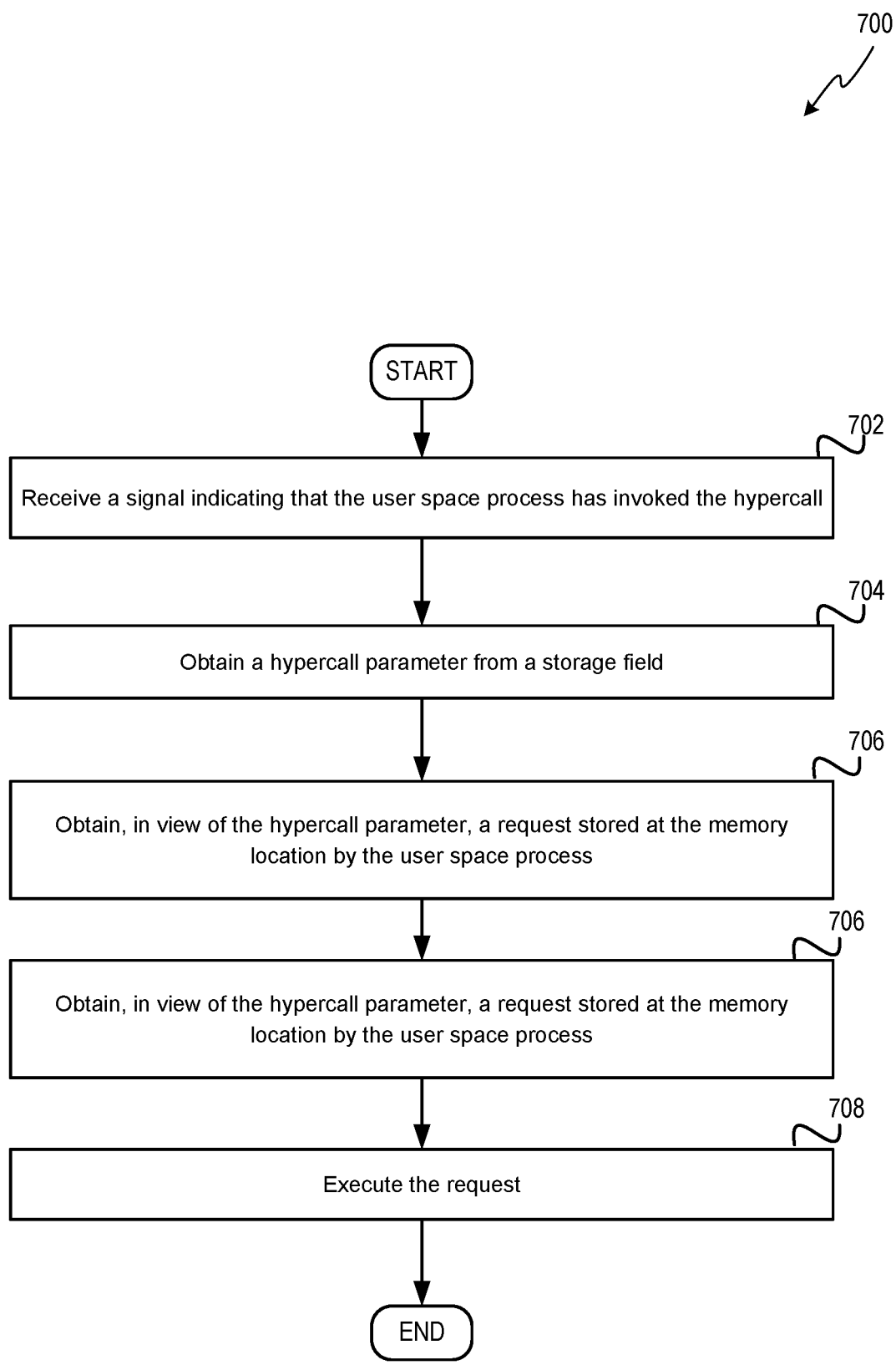
FIG. 7 depicts a flow diagram of an example method for enabling a hypervisor to obtain, using a hypercall parameter, and securely execute a request associated with a hypercall invoked by a guest user space process operating on a virtual machine, in accordance with one or more aspects of the present disclosure.

FIG. 7 depicts a flow diagram of an example method 700 for enabling a hypervisor to obtain, using a hypercall parameter, and securely execute a request associated with a hypercall invoked by a guest user space process operating on a virtual machine, in accordance with one or more aspects of the present disclosure. Method 700 may be similar to method 300 and may be performed in the same or a similar manner as described above in regards to FIG. 3. Method 700 may be performed by a processing device executing the hypervisor executable code 505 and/or 205 and may begin at block 702.

At block 702, the processing device executing a hypervisor may receive a signal indicating that the user space process has invoked the hypercall. Before, during or after invoking the hypercall, the user space process may store a request in a memory location that is associated with the user space process and that is associated with a type of the request. In some embodiments, the hypervisor may have allocated the memory location for the user space process and associated the memory location with the user space process. Associating the user space process with the memory location may provide the user space process with authorization to access and modify the memory location. Further, before, during, or after invoking the hypercall, the user space process may store a hypercall parameter in a storage field. The storage field may include a general purpose register of the processing device executing the hypervisor.

At block 704, the processing device executing the hypervisor may obtain the hypercall parameter from the storage field. The hypercall parameter may be associated with the location of the memory location that is accessible to the user space process and the hypervisor. The hypervisor may maintain this association in the mapping data structure 246 of FIG. 2. The hypervisor may also maintain an association of the hypercall parameter and a type of the request that is allowed to be stored in the memory location.

At block 706, the processing device executing the hypervisor may obtain, in view of the hypercall parameter, a request stored at the memory location by the user space process. The hypervisor may use the association stored in the mapping data structure 246 of FIG. 2 to find the location of the data structure using the hypercall parameter, and then search the memory location to identify and obtain the request associated with the hypercall invoked by the user space process.

The processing device may also determine whether the request is permitted to be executed by one or more of finding the request in the memory location that is associated with the user space process, determining that the request is of a proper type for the memory location, and/or determining that the request is valid (e.g., determining whether a valid bit associated with the request is set to a value indicating the request is valid).

At block 708, the processing device executing the hypervisor may execute the request in response to determining that the request is permitted to be executed. After executing the request the processing device may provide a notification to the user space process that the request has been executed. Further, control may be transferred back to the user space process. The notification may include a response signal and may be transmitted directly from the hypervisor to the user space process or transmitted indirectly to the user space process by first going to the kernel of the guest operating system, which may then inform the user space process that originated the request.

Figure 8:
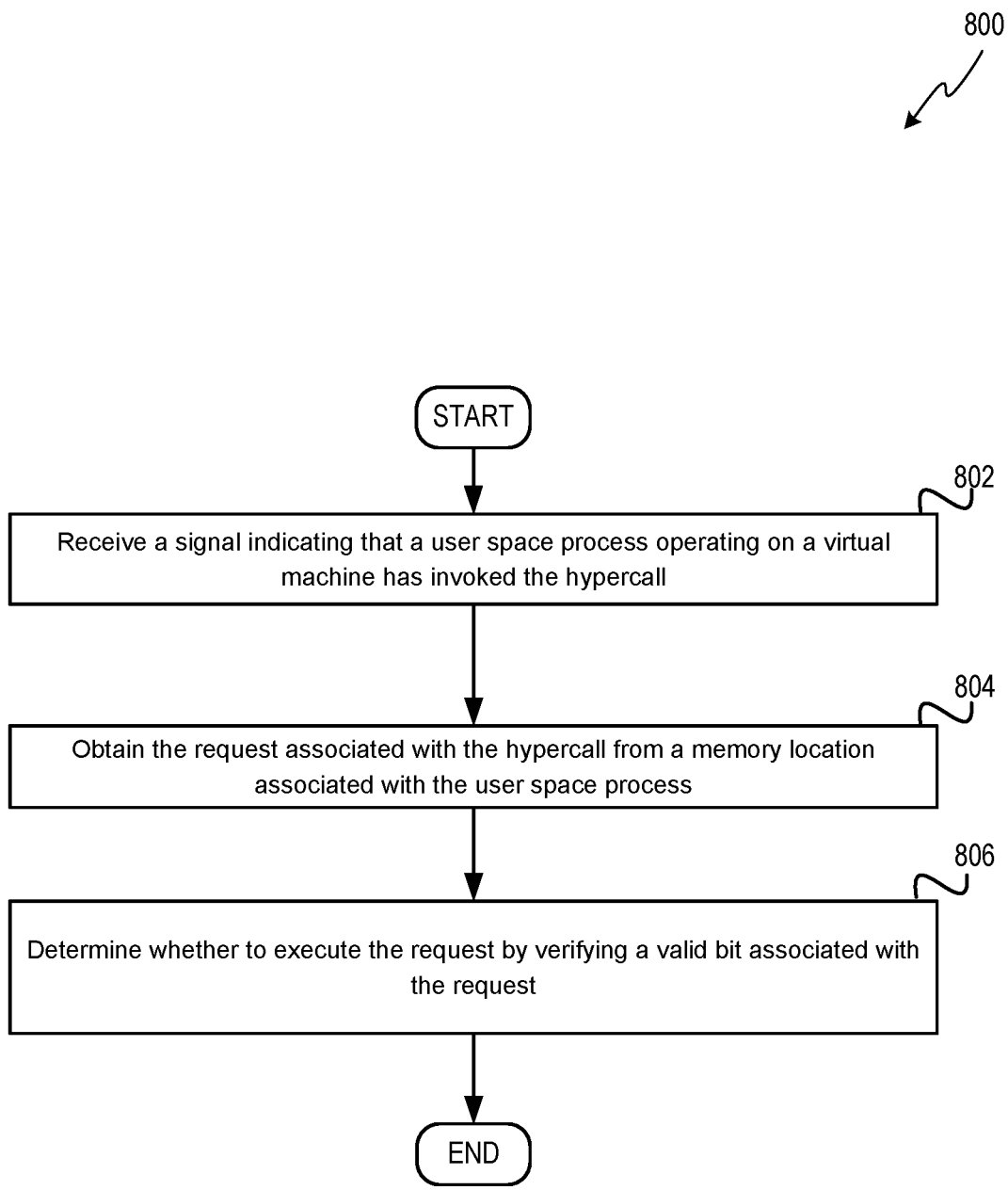
FIG. 8 depicts a flow diagram of an example method for enabling a hypervisor to determine whether to execute a request by performing one or more verifications, in accordance with one or more aspects of the present disclosure.

FIG. 8 depicts a flow diagram of an example method 800 for enabling a hypervisor to determine whether to execute a request by performing one or more verifications, in accordance with one or more aspects of the present disclosure. Method 800 may be similar to method 300 and may be performed in the same or a similar manner as described above in regards to FIG. 3. Method 800 may be performed by a processing device executing the hypervisor executable code 505 and/or 205 and may begin at block 802.

At block 802, the processing device executing the hypervisor may receive a signal indicating that a user space process operating on a virtual machine has invoked a hypercall. The hypercall may cause a context switch from the user space process to the hypervisor. Before, during or after invoking the hypercall, the user space process may store a request in a memory location that is associated with the user space process and that is associated with a type of the request. In some embodiments, the hypervisor may have allocated the memory location for the user space process and associated the memory location with the user space process. Associating the user space process with the memory location may provide the user space process with authorization to access and modify the memory location. Further, before, during, or after invoking the hypercall, the user space process may store a hypercall parameter in a storage field. The storage field may include a general purpose register of the processing device executing the hypervisor.

At block 804, the processing device executing the hypervisor may obtain the request associated with the hypercall from the memory location associated with the user space process. In some embodiments, more than one user space process may be authorized to access the memory location. If, for example, a first user space process and a second user space process are coordinating operations with one another, the first user space process may invoke the hypercall and the second user space process may store a request in the memory location.

The processing device may obtain a hypercall parameter from a storage field and use the hypercall parameter to locate and obtain the request. The hypercall parameter may be associated with the location of the memory location that is accessible to the user space process and the hypervisor. The hypervisor may maintain this association in the mapping data structure 246 of FIG. 2. The hypervisor may also maintain an association of the hypercall parameter and a type of the request that is allowed to be stored in the memory location. The hypervisor may use the association stored in the mapping data structure 246 of FIG. 2 to find the location of the data structure using the hypercall parameter, and then search the memory location to identify and obtain the request associated with the hypercall invoked by the user space process.

At block 806, the processing device executing the hypervisor may determine whether to execute the request. Determining whether to execute the request may include at least one of obtaining the request from the memory location that the user space process is authorized to access, determining whether the request is new (e.g., verifying an index associated with the request or verifying a valid bit associated with the request), and/or determining whether the type of the request stored in the memory location is of a type associated with that memory location.

If the processing device determines that the request is permitted to be executed, the processing device may execute the request. Further, the hypervisor may provide a notification to the user space process that the request has been executed. If the processing device determines that the request is not permitted to be executed, the processing device may notify the user space process that the request was not executed.

Figure 9:
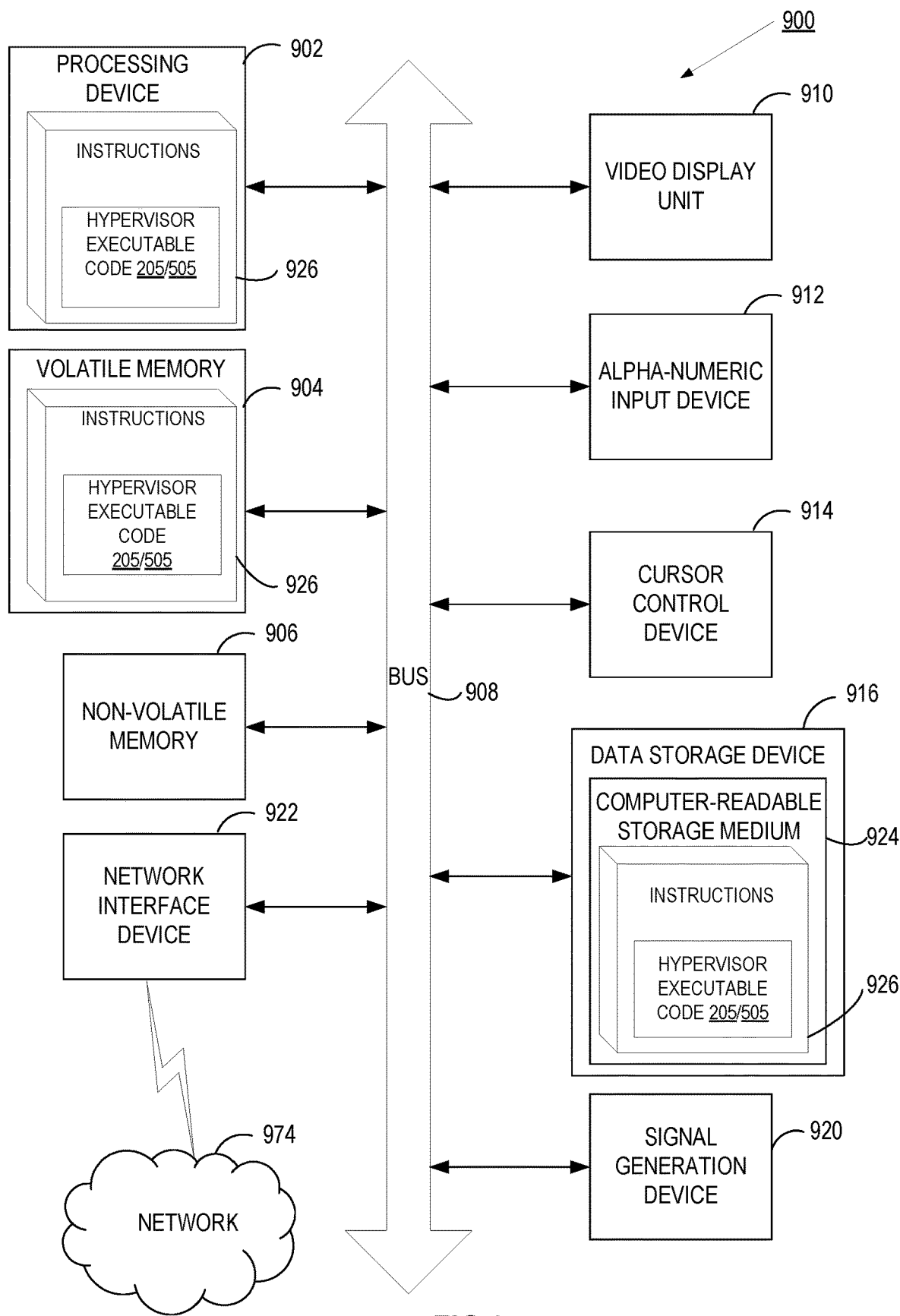
FIG. 9 depicts a block diagram of an illustrative computing device operating in accordance with the examples of the present disclosure.

FIG. 9 depicts a block diagram of a computer system operating in accordance with one or more aspects of the present disclosure. In various illustrative examples, computer system 900 may correspond to computing system 100 of FIG. 1, the computing system 200 of FIG. 2, or the computing system 500 of FIG. 5. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alpha-numeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 300, 400, 600, 700, and/or 800 and for hypervisor executable code 205 of FIG. 2 or hypervisor executable code 505 of FIG. 5.

Instructions 926 may also reside, completely or partially, within volatile memory 904 and/or within processing device 902 during execution thereof by computer system 900, hence, volatile memory 904, and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a non-transitory computer-readable storage medium storing instructions for a hypervisor, the instructions causing a processing device to: identify, by the hypervisor, a memory location associated with a user space process operating on a virtual machine and a type of a request to be stored at the memory location by the user space process when the user space process invokes the hypercall; associate a hypercall parameter with the memory location and the type of the request to be stored at the memory location by the user space process, the hypercall parameter to be used to determine whether the type of the request associated with the hypercall invoked by the user space process is permitted to be executed; and transmit a notification comprising the hypercall parameter to the user space process to cause the user space process to use the hypercall parameter when invoking the hypercall to indicate to the hypervisor the memory location and the type of the request is stored at the memory location.

Example 2 is the computer-readable storage medium of Example 1, wherein the processing device is further to: detect that the user space process has invoked the hypercall, the hypercall parameter to be stored by the user space process at a storage field when invoking the hypercall;

obtain the hypercall parameter from the storage field; obtain the type of the request and the memory location in view of the association between the hypercall parameter and the type of the request and the memory location; and determine whether the type of the request stored in the memory location is permitted to be executed in view of the association between the hypercall parameter and the type of the request.

Example 3 is the computer-readable storage medium of Example 1, wherein to identify the memory location and the type of the request to be stored at the memory location, the processing device is further to: receive the memory location and the type of the request from the user space process operating on the virtual machine.

Example 4 is the computer-readable storage medium of Example 1, wherein the hypervisor is further to, responsive to identifying the memory location and the type of the request to be stored at the memory location, generate the hypercall parameter to associate with the memory location and the type of the request to be stored at the memory location.

Example 5 is the computer-readable storage medium of Example 1, wherein the user space process is authorized to store the request at the memory location.

Example 6 is the computer-readable storage medium of Example 1, wherein the hypercall parameter comprises an index value corresponding to a table entry indicating at least a memory address of the memory location.

Example 7 is the computer-readable storage medium of Example 1, wherein the request comprises an operation for a hardware resource managed by the hypervisor, the hardware resource comprising a network interface device, a graphics device, or a storage device.

Example 8 is the computer-readable storage medium of Example 1, wherein the processing device is further to: identify, by the hypervisor, a second memory location associated with the user space process operating on the virtual machine and a second type of a second request to be stored at the second memory location by the user space process when the user space process invokes the hypercall; associate a second hypercall parameter with the second memory location and the second type of the second request to be stored at the second memory location by the user space process, the second hypercall parameter to be used to determine whether the second type of the second request associated with the hypercall invoked by the user space process is permitted to be executed; and transmit a second notification comprising the second hypercall parameter to the user space process to cause the user space process to use the second hypercall parameter when executing the hypercall to indicate to the hypervisor that the second type of the second request is stored at the second memory location.

Example 9 is a method for a hypervisor, the method comprising: maintaining, via the hypervisor, an association between a hypercall parameter and a memory location at which the user space process is authorized to store a request associated with the hypercall when invoking the hypercall, the hypercall parameter to be stored by the user space process at a storage field when invoking the hypercall; detecting that the user space process has invoked the hypercall; obtaining the hypercall parameter from the storage field; and identifying, in view of the association between the hypercall parameter and the memory location, the request stored at the memory location to determine whether the request is permitted to be executed when the hypercall is invoked by the user space process.

Example 10 is the method of Example 9, wherein the storage field comprises a general purpose register of a processing device executing the hypervisor and the virtual machine.

Example 11 is the method of Example 9, wherein determining whether the request is permitted to be executed when the hypercall is invoked by the user space process further comprises: determining whether a valid bit associated with the request is set to a value indicating the request is valid.

Example 12 is the method of Example 9, wherein determining whether the request is permitted to be executed when the hypercall is invoked by the user space process further comprises: determining whether the request stored at the memory location is of a type that the user space process indicated will be stored at the memory location.

Example 13 is the method of Example 9, wherein the request comprises an operation for a hardware resource managed by the hypervisor, the hardware resource comprising a network interface device, a graphics device, or a storage device.

Example 14 is the method of Example 9, further comprising: responsive to executing the request, providing a notification to the user space process that the request associated with the hypercall has been executed.

Example 15 is the method of Example 14, wherein the notification comprises storing data a storage field to indicate to the user space process that the request associated with the hypercall has been executed.

Example 16 is a method for a hypervisor to securely execute a request associated with a hypercall invoked by a user space process operating on a virtual machine, the method comprising: receiving, by the hypervisor, a signal indicating that the user space process has invoked the hypercall; determining, by the hypervisor, whether a request associated with the hypercall is permitted to be executed, wherein the determining comprises searching memory location associated with the user space process for the request associated with the hypercall, the memory location being accessible to the user space process and the hypervisor; and in response to determining that the request associated with the hypercall is permitted to be executed, executing the request associated with the hypercall for the user space process.

Example 17 is the method of Example 16, wherein determining that the request associated with the hypercall is permitted to be executed further comprises: determining whether a valid bit associated with the request is set to a value indicating the request is valid.

Example 18 is the method of Example 16, further comprising: providing a notification to the user space process that the request associated with the hypercall has been executed.

Example 19 is the method of Example 18, wherein providing the notification further comprises storing the notification in a storage field to indicate to the user space process that the request associated with the hypercall has been executed.

Example 20 is the method of Example 16, further comprising, subsequent to receiving, by the hypervisor, the signal indicating that the user space process has invoked the hypercall, obtaining a hypercall parameter from a storage field, wherein the hypercall parameter is associated with the memory location.

Example 21 is the method of Example 20, wherein the storage field comprises a general purpose register of a processing device executing the hypervisor and the virtual machine.

Example 22 is a system to enable a hypervisor to securely execute a request associated with a hypercall invoked by a user space process operating on a virtual machine, the system comprising: a memory; a processing device operatively coupled to the memory, the processing device to execute the hypervisor to: receive a signal indicating that the user space process has invoked the hypercall; obtain a hypercall parameter from a storage field, wherein the hypercall parameter is associated with a memory location that is accessible to the user space process and the hypervisor; obtain, in view of the hypercall parameter, a request stored at the memory location by the user space process; and execute the request.

Example 23 is the system of Example 22, wherein the processing device is further to: allocate the memory location for the user space process; and associate the memory location with the user space process.

Example 24 is the system of Example 22, wherein the storage field comprises a general purpose register of the processing device executing the hypervisor.

Example 25 is the system of Example 22, wherein the processing device is further to: provide a notification to the user space process that the request has been executed.

Example 26 is the system of Example 22, wherein the processing device is further to: determine whether the request is permitted to be executed by: determining whether a valid bit associated with the request is set to a value indicating the request is valid.

Example 27 is the system of Example 22, wherein the processing device is further to: determine whether the request is permitted to be executed by: determining whether the request stored in the memory location is of an expected type associated with the memory location.

Example 28 is an apparatus for securely executing a request associated with a hypercall, the apparatus comprising: a means for receiving a signal indicating that a user space process operating on a virtual machine has invoked the hypercall; a means for obtaining the request associated with the hypercall from a memory location associated with the user space process; and a means for determining whether to execute the request, wherein the determining comprises verifying a valid bit associated with the request.

Example 29 is the apparatus of Example 28, wherein the user space process is authorized to access the memory location.

Example 30 is the apparatus of Example 28, further comprising a means for executing the request associated with the hypercall.

Example 31 is the apparatus of Example 28, further comprising a means for setting the valid bit to a value indicating that the request has been executed in response to executing the request.

Example 32 is the apparatus of Example 28, further comprising a means for obtaining a hypercall parameter from a register, wherein the hypercall parameter is stored in the register by the user space process when the user space process invokes the hypercall, and the hypercall parameter is associated with the memory location.

Example 33 is the apparatus of Example 28, further comprising a means for maintaining an association between the hypercall parameter and the memory location.

What is claimed is:

1. A non-transitory computer-readable storage medium storing instructions for a hypervisor, the instructions causing a processing device to:

allocate, by the hypervisor, a memory location for a user space process operating on a virtual machine and managed by a guest operating system;

authorize, by the hypervisor, the user space process to access and modify the memory location;

identify, by the hypervisor, a particular type of a request associated with a hypercall, wherein the request is to be stored at the memory location by the user space process for an invocation of the hypercall;

associate a hypercall parameter with the memory location and the particular type of the request to be stored at the memory location by the user space process, the hypercall parameter indicating whether the particular type of the request associated with the hypercall to be invoked by the user space process is permitted to be executed;

transmit a notification comprising the hypercall parameter to the user space process to cause the user space process to use the hypercall parameter to invoke the hypercall to indicate to the hypervisor the memory location and the type of the request that is stored at the memory location; and determine, by the hypervisor, whether the request associated with the hypercall is permitted to be executed, wherein to determine whether the request is permitted to be executed, the processing device is further to:

obtain the request from the memory location that the user space process is authorized to access, determine whether a valid bit associated with the request is set to a value indicating the request is valid, and determine whether the type of the request stored in the memory location corresponds to the particular type associated with the memory location.

2. The computer-readable storage medium of claim 1, wherein the processing device is further to:

detect that the user space process has invoked the hypercall, the hypercall parameter stored by the user space process at a storage field to invoke the hypercall;

obtain the hypercall parameter from the storage field;

obtain the type of the request and the memory location in view of the association between the hypercall parameter and the type of the request and the memory location; and determine whether the type of the request stored in the memory location is permitted to be executed in view of the association between the hypercall parameter and the type of the request.

3. The computer-readable storage medium of claim 1, wherein to identify the memory location and the type of the request stored at the memory location, the processing device is further to:

receive the memory location and the type of the request from the user space process operating on the virtual machine.

4. The computer-readable storage medium of claim 1, wherein the hypervisor is further to, responsive to identifying the memory location and the type of the request stored at the memory location, generate the hypercall parameter to associate with the memory location and the type of the request stored at the memory location.

5. The computer-readable storage medium of claim 1, wherein the type of the request stored at the memory location comprises one or more of a network operation, a graphics operation, or a storage operation.

6. The computer-readable storage medium of claim 1, wherein the hypercall parameter comprises an index value corresponding to a table entry indicating at least a memory address of the memory location.

7. The computer-readable storage medium of claim 1, wherein the request comprises an operation for a hardware resource managed by the hypervisor, the hardware resource comprising a network interface device, a graphics device, or a storage device.

8. The computer-readable storage medium of claim 1, wherein the processing device is further to:
  allocate, by the hypervisor, a second memory location for the user space process operating on the virtual machine;
  authorize, by the hypervisor, the user space process to store one or more second requests at the second memory location;
  identify, by the hypervisor, a second type of a second request stored at the second memory location by the user space process for an invocation of the hypercall;
  associate a second hypercall parameter with the second memory location and the second type of the second request stored at the second memory location by the user space process, the second hypercall parameter indicating whether the second type of the second request associated with the hypercall invoked by the user space process is permitted to be executed; and
  transmit a second notification comprising the second hypercall parameter to the user space process to cause the user space process to use the second hypercall parameter to execute the hypercall to indicate to the hypervisor that the second type of the second request is stored at the second memory location.

9. The computer-readable storage medium of claim 1, wherein the user space process attempts to store the request at the memory location responsive to invoking the hypercall, wherein the attempt to store the request causes one or more security checks to be performed, and wherein the security checks determine whether the user space process is authorized to modify the memory location and are performed prior to allowing the user space process to store the request at the memory location.

10. A method for a hypervisor, the method comprising:
  allocating, by the hypervisor, a memory location for a user space process operating on a virtual machine and managed by a guest operating system;
  authorizing, by the hypervisor, the user space process to access and modify the memory location;
  maintaining, via the hypervisor, an association between a hypercall parameter and the memory location, the hypercall parameter stored by the user space process at a storage field to invoke a hypercall;
  detecting, by the hypervisor, that the user space process has invoked the hypercall;
  obtaining the hypercall parameter from the storage field; and
  determining, by the hypervisor, whether a request associated with the hypercall is permitted to be executed, wherein determining whether the request associated with the hypercall is permitted to be executed comprises:
    obtaining the request from the memory location,
    determining whether a valid bit associated with the request is set to a value indicating the request is valid, and
    determining whether the request stored at the memory location is of a type that the user space process indicated is to be stored at the memory location.

11. The method of claim 10, wherein the storage field comprises a general purpose register of a processing device executing the hypervisor and the virtual machine.

12. The method of claim 10, wherein the user space process attempts to store the request at the memory location responsive to invoking the hypercall, wherein the attempt to store the request causes one or more security checks to be performed, and wherein the security checks determine whether the user space process is authorized to modify the memory location and are performed prior to allowing the user space process to store the request at the memory location.

13. The method of claim 10, wherein the request comprises an operation for a hardware resource managed by the hypervisor, the hardware resource comprising a network interface device, a graphics device, or a storage device.

14. The method of claim 10, further comprising:
  responsive to executing the request, providing a notification to the user space process that the request associated with the hypercall has been executed.

15. The method of claim 14, wherein the notification comprises storing data in a storage field to indicate to the user space process that the request associated with the hypercall has been executed.

16. A method for a hypervisor, the method comprising:
  allocating, by the hypervisor, a memory location for a user space process operating on a virtual machine and managed by a guest operating system;
  authorizing, by the hypervisor, the user space process to access and modify the memory location;
  receiving, by the hypervisor, a signal indicating that the user space process operating on the virtual machine and managed by the guest operating system has invoked a hypercall;
  determining, by the hypervisor, whether a request associated with the hypercall is permitted to be executed, wherein determining whether the request associated with the hypercall is permitted to be executed comprises:
    obtaining the request from the memory location,
    determining whether a valid bit associated with the request is set to a value indicating the request is valid, and
    determining whether the request stored at the memory location is of a type that the user space process indicated is to be stored at the memory location; and
  in response to determining that the request associated with the hypercall is permitted to be executed, executing the request associated with the hypercall for the user space process.

17. The method of claim 16, wherein the user space process attempts to store the request at the memory location responsive to invoking the hypercall, wherein the attempt to store the request causes one or more security checks to be performed, wherein the security checks determine whether the user space process is authorized to modify the memory location and are performed prior to allowing the user space process to store the request at the memory location.

18. The method of claim 16, further comprising:
  providing a notification to the user space process that the request associated with the hypercall has been executed.

19. The method of claim 18, wherein providing the notification further comprises storing the notification in a storage field accessible to the user space process.

20. The method of claim 16, further comprising, subsequent to receiving, by the hypervisor, the signal indicating that the user space process has invoked the hypercall, obtaining a hypercall parameter from a storage field, wherein the hypercall parameter is associated with the memory location.

* * * * *